Dec. 15, 1953
R. CLIBORN
2,662,480
SEAL
Filed Oct. 4, 1950
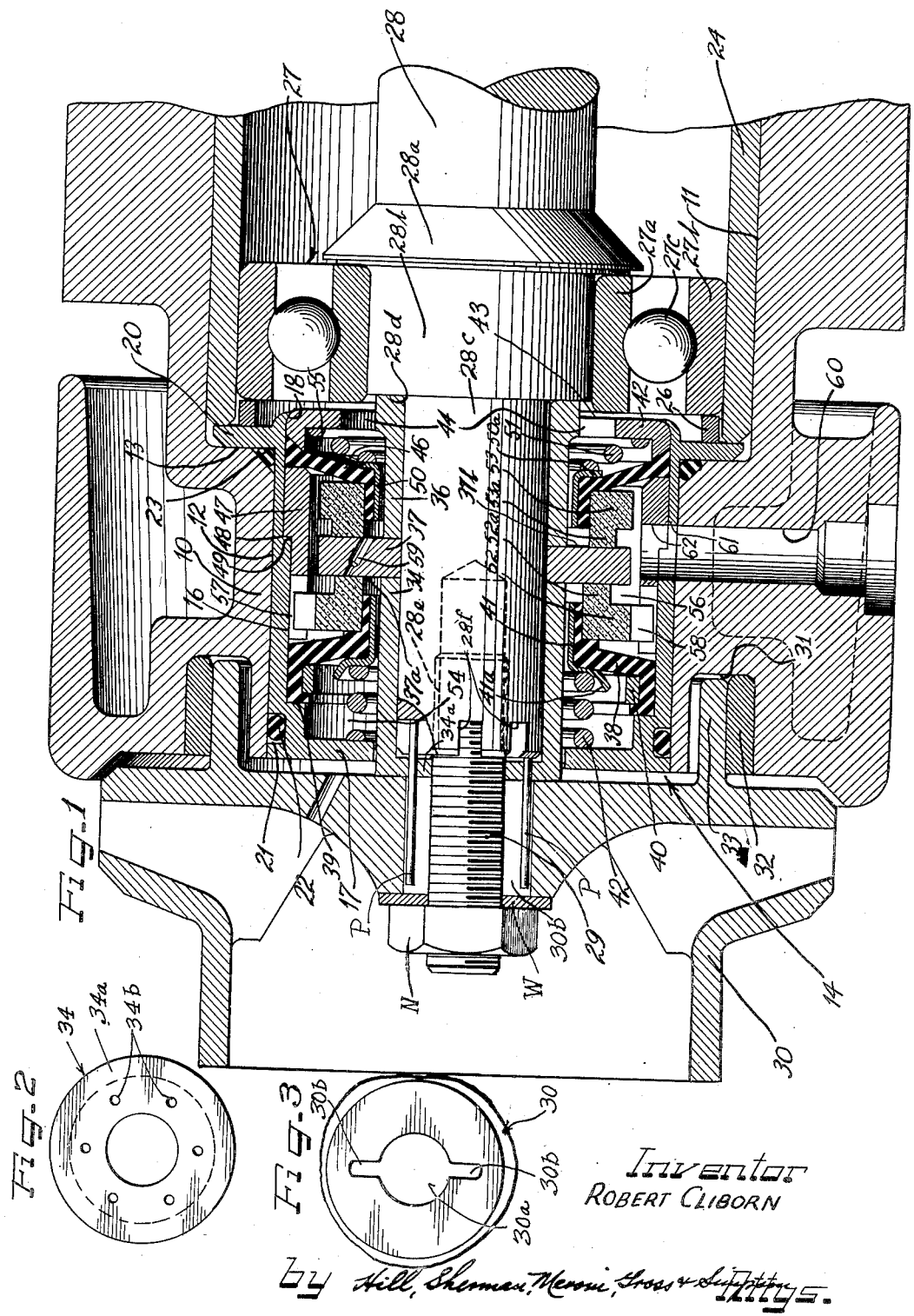
Inventor
ROBERT CLIBORN
by Hill, Sherman, Meroni, Gross & Simpson
Attys.

Patented Dec. 15, 1953

2,662,480

UNITED STATES PATENT OFFICE 2,662,480

SEAL

Robert Cliborn, Euclid, Ohio, assignor to Thompson Products, Inc., Cleveland, Ohio, a corporation of Ohio Application October 4, 1950, Serial No. 188,424

6 Claims. (Cl. 103—111)

1

This invention relates generally to a mechanical face type shaft seal and more particularly to a cartridge unit shaft seal including a double seal arrangement cooperable with a rotatable shaft ring and having a drain between the double seals with a drain hole extending through the cartridge shell and further including a rotatable shaft ring provided with a lubricating passage establishing communication with one of the seal faces of the ring and a lubrication chamber formed in the cartridge by the sealing components thereof.

According to the general features of the present invention, a cartridge unit shaft seal is provided having a hollow generally cylindrical casing. A pair of sleeves and a hard metal shaft ring are adapted to be co-rotatably mounted in axial alignment on a rotatable shaft with the hollow casing generally surrounding the shaft ring. The casing is generally cup-shaped and has its open end closed by a cap so that each of the end portions of the casing may bottom a coil spring arranged to surround the shaft. A pair of flexible sleeve-type diaphragms are mechanically clamped in the casing and the free end of each is seated on a retainer ring constructed to engage one of the coil springs surrounding the shaft. A non-rotatable annular seal ring is also carried on the free end of each of the diaphragm sleeves and is arranged to be resiliently biased into sealing engagement with the radial seal faces of the shaft ring, thereby to establish a pair of spaced apart chambers in the cartridge with a medially disposed venting chamber therebetween.

One of the features of the present seal arrangement lies in the provision of a shaft ring having an obliquely disposed passageway extending from one radial face thereof opposite the seal ring to the opposite radial face thereof in communication with one of the chambers in the cartridge. By such provision, the sealing face of the shaft ring may be adequately lubricated by the fluid in the chamber.

Another feature lies in the provision of means defining a venting passageway extending through the cartridge of the shaft seal so as to establish communication between the venting chamber and the atmosphere.

The outer periphery of the cartridge casing is preferably provided with means accommodating O-ring seal means so that the cartridge casing may be easily inserted within a housing member and an adequate sealing relationship may be readily established.

2

It is an object of the present invention, therefore, to provide an improved shaft seal whereby a fluid may be prevented from escaping through an opening provided in the wall of a mechanism housing through which a rotating shaft protrudes.

Another object of the present invention is to provide a double seal arrangement in a single cartridge cooperable with a rotatable shaft ring and having a drain between the seals so as to vent any leakage outwardly of the cartridge.

Many other advantages, features and additional objects of the present invention will become manifest to those versed in the art upon making reference to the detailed description which follows and the accompanying sheet of drawings in which a preferred embodiment of a seal constructed in accordance with the principles of the present invention is shown.

On the drawings:

Figure 1 is a cross-sectional view with parts in elevation of a typical housing element having a protruding shaft with a cartridge type shaft seal according to the present invention surrounding the protruding shaft in the housing.

Figure 2 is an end elevational view of a sleeve in the assembly of Figure 1.

Figure 3 is a fragmentary plan view of the hub of the impeller of Figure 1.

As shown on the drawings:

Although not limited thereto, the shaft seal constructed in accordance with the principles of the present invention finds a particular utility when employed in connection with a high speed fuel pump driven by an air turbine or other suitable prime mover, the speed of rotation of the shaft with which the seal is associated approaching velocities as high as 35,000 R. P. M. It will be understood, however, that the sealing structure described and claimed can be effectively used wherever it is necessary to double seal a housing having an opening for a protruding shaft.

In Figure 1, a housing is indicated by the reference numeral 10 and includes a stepped bore defining a first enlarged recess 11 and a reduced diameter recess 12, there being an annular shoulder 13 formed therebetween.

A cartridge-type shaft seal is indicated generally by the reference numeral 14 and includes a generally cylindrical cup-shaped casing 16 substantially closed at one end as at 17 and having the other end open as at 18. The closed end of the casing 16 has an aperture 19 adapted to pass a rotatable member as will be explained presently.

Adjacent the open end of the casing 16 is an annular flange 20 which is arranged to engagingly abut the shoulder 13 formed between the recesses 11 and 12.

A peripheral groove 21 is formed in the surface of the casing 16 and receives an O-ring gasket 22 arranged therein to provide a seal between the casing 16 and the walls of the recess 12 in the housing 10. A second O-ring gasket 23 is provided directly adjacent the flange 20 for the same purpose. The casing 16 of the cartridge seal unit 14 is held in firm assembly with the housing 10 and in the recess 12 thereof by means of a sleeve 24 which is pressed or otherwise suitably inserted in the recess 11 of the housing 10 into engaging abutment with the flange 20 of the casing 16. A suitable spacer ring 26 is provided interiorly of the sleeve 24 and abuts the flange 20 so that a bearing means 27 including an inner race 27a, an outer race 27b and shiftable elements 27c may be mounted in the sleeve 24 to rotatably receive the protrusion of a shaft 28. In the particular embodiment shown in Figure 1, the shaft 28 is provided with a flange 28a and a first reduced diameter portion 28b which together form a recess in which is received the inner race 27a of the bearing means 27, there being a further reduced diameter portion 28c extending away from the first reduced diameter portion 28b with a shoulder 28d formed therebetween.

The end of the reduced diameter portion 28c is provided with a threaded recess 28e which threadedly receives a fastening stud 29 employed to mount a centrifugal impeller 30 on the end of the shaft 28. The end face of the shaft portion 28c is castellated to provide a plurality of keyways (preferably six) 28f around the recess 28e.

It will be noted that the housing 10 is provided with an annular groove 31 concentrically disposed relative to the recess 12 and arranged to receive in pressed relationship therewith a suitable metal wearing ring 32 which cooperates with an axially extending annular rib 33 formed on the impeller 30 and arranged in concentric close-running clearance relationship.

Turning now to the details of construction of the cartridge type seal unit 14, it will be noted that a pair of sleeves 34 and 36 are provided and are arranged to telescope over the reduced diameter portion 28c of the shaft 28. The sleeve 36 engagingly abuts the shoulder 28d on the shaft 28 at one end and the other end thereof is employed to abut a rotating hard metal shaft ring 37. The sleeve 34 engages the other side of the shaft ring 37 and has an end face 34a threaded onto the stud 29 to overlie the castellated end face of the shaft portion 28c. The sleeve 34 is tightened against the shaft ring 37 to cause the ring to be pinched between the sleeves 34 and 36, thereby to effect a co-rotatable relationship with the shaft 28. The shaft ring 37 is preferably lapped on both radial faces so as to provide a first seal face 37a and a second seal face 37b.

The end face 34a of the sleeve 34 has a ring of holes 34b (Fig. 2) therearound to register with the keyways 28f. The impeller 30 has a slotted stud-receiving aperture 30a through its hub portion. Diametrically opposed radial slots 30f are registered with a pair of holes 34b of the sleeve 34 and this pair of holes, in turn, is registered with keyways 28f of the shaft. A key or pin P is dropped into each slot 30b through the hole 34b and into the keyway 28f to lock the impeller and sleeve 34 on the shaft. A washer W on the stud overlies the slots 30b and a nut N threaded on the stud bottoms the impeller 30 on the end face 34a of the sleeve and clamps the washer against the impeller. The pins P under the washer W are sufficiently long so that they cannot drop out of the keyways.

The casing 16 is provided with a generally cylindrical wall portion forming a plurality of stepped counter-bores progressively increasing in diameter toward the open end 18 of the casing, thus, a flexible sleeve type diaphragm 38 made of a suitable elastic material is provided with an annular flanged end portion having an axially extending portion arranged to engage the wall portion of the casing 16 and with the flanged portion arranged to engage the shoulder 39 formed between the innermost counterbored stepped portions. The diaphragm 38 is retained in firm assembly within the cartridge casing 16 mechanically, for example, by means of a metal band 40.

A metal retainer ring 41 is provided to snugly receive the other end of the diaphragm 38, the retainer ring 41 being provided with a flared flange portion 41a which is arranged to bottom one end of a coil spring 42 having its opposite end engaging the closed end portion 17 of the casing 16, thereby to normally bias the retainer ring 41 together with the end of the diaphragm 38 in an axial direction.

On the other side of the shaft ring 37, a somewhat similar seal diaphragm arrangement is provided. An annular ring-like cap member 43 having a central aperture 44 encircles the reduced diameter portion 28c of the shaft 28 and is telescopically received by the casing 16. A second flexible sleeve type diaphragm 46 made of a suitably elastic material engages the wall portion of the casing 16 and is clamped in firm assembly therewith between a flanged annular shoulder formed on the ring 43 and an insertable sleeve 47 which is also telescopically received by the casing 46. It will be noted that the insertable sleeve 47 is provided with the medial shoulder 48 which abuts a similarly formed annular shoulder 49 formed between the stepped counterbores of the casing 16.

The other end of the diaphragm 46 is snugly received by a metal retainer ring 50 having a flanged portion 50a arranged to bottom one end of a coil spring 51 having its opposite end seated on the body portion of the ring-like cap 43, thereby to resiliently bias the ring 50 and the end of the diaphragm 46 in an axial direction.

A pair of non-rotatable seal rings 52 and 53, respectively, preferably made of a softer material than the shaft ring 37, for example, carbon or the like are supported by the diaphragms 38 and 46, respectively. Each of the non-rotatable seal rings 52 and 53 are provided with an axially extending annular rib portion 52a or 53a, respectively, constituting bearing surfaces for sealingly engaging the respective sealing faces 37a and 37b of the shaft ring 37. Since the seal rings 52 and 53 are preloaded by the coil springs 42 and 51 and are floatingly supported by the flexible diaphragms 38 and 46, the nonrotatable seal rings 52 and 53 will run square on the shaft ring 37 and together with the shaft ring 37, as well as the casing 16, will establish a first chamber 54, a second chamber 55 and a medial venting chamber 56.

It should be noted that the insertable ring 47 is provided with an axially extending portion forming a plurality of radially spaced fingers 57 and the seal ring 52 is likewise provided with a radially extending portion forming a plurality of spaced apart finger portions 58. The fingers 57 and 58 constitute interlocking mating means which preclude rotation of the non-rotatable seal ring 52 thereby eliminating torsional strain on the flexible diaphragm 38 which might be created by the frictional contact of the seal ring 52 with the sealing face 37a of the shaft ring 37.

It should also be noted that the shaft ring 37 is provided with an obliquely disposed passageway 59 which extends from the sealing face 37a directly opposite the rib 52a of the seal ring 52 to the opposite sealing face 37b of the shaft ring 37 at a point radially inwardly of the rib 53a of the seal ring 53 and in communication with the chamber 55. The passageway 59 permits fluid to move from the chamber 55 to the face of the seal provided between the sealing face 37a and the seal ring 52.

As is clearly indicated on the drawing, means are provided defining a venting passageway 60 which extends through the housing 10 and lies in registry with an aperture 61 formed in the casing 16 as well as an aperture 62 formed in the insertable ring 47, thereby to establish venting communication between the venting chamber 56 and the atmosphere.

In the present embodiment the cartridge unit 14 provides a double seal arrangement between the impeller end of a pump and the pump housing, thus, if any fuel leaks into the venting chamber 56 from the chamber 54, it will be vented to the atmosphere through the aperture 62, the aperture 61 and the venting passageway 60. Moreover, lubricant carried in the chamber 55 will be supplied to lubricate the seal contact between the shaft ring 37 and the seal ring 52 on the fuel side thereof.

In operation, it will be apparent that the sealing arrangement described affects a multi-purpose function in that the double seal arrangement within a single cartridge case not only effectively seals between the pump and atmosphere, the fuel chamber 54 being isolated by the diaphragm 38 and the sealing ring 52, but in addition seals between the lubrication chamber and atmosphere, the lubrication chamber 55 being isolated by the flexible diaphragm 46 and the sealing ring 53, and in so doing, any fuel leakage which might possibly occur exits the venting chamber 56 to the atmosphere through the venting passageway 60.

Although I have resorted to detail in describing the structural features of the preferred embodiment of my invention, it should be understood that I wish to embody within the scope of this patent all such modifications as reasonably and properly come within the scope of my contribution to the art.

I claim as my invention:

1. A cartridge unit shaft seal comprising, in combination, a pair of sleeves and a shaft ring adapted to be co-rotatably mounted in axial alignment on a rotatable shaft, said shaft ring being clamped between said sleeves, a cup-shaped casing having a generally cylindrical wall portion forming a plurality of stepped counterbores progressively increasing in diameter toward the open end of the casing arranged around said shaft in the locale of said shaft ring, a first coil spring having one end engaging the closed end of the casing and arranged to encircle one of said pair of sleeves, a first retainer ring seating the other end of said first coil spring, a first flexible diaphragm sleeve having one end snugly seated on said first retainer ring and the other end engaging said wall portion of said casing and shouldered against a first annular abutment formed between said stepped counterbores, a press ring mechanically locking said other end of said first diaphragm sleeve in said casing, a first annular seal ring encircling said one end of said first diaphragm sleeve and having an axially extending rib arranged to engage one radial face of said shaft ring under the bias of said first coil spring, a sleeve insertable in said casing and having a medial annular shoulder arranged to engage a second annular abutment formed between said stepped counterbores, said sleeve and said first annular seal ring having interlocking mating means to relieve torsional strain on said first diaphragm sleeve, a second flexible diaphragm sleeve having one end engaging said wall portion of said casing and shouldered against said insertable sleeve, a second retainer ring seating the other end of said second diaphragm sleeve, a second annular seal ring encircling said other end of said diaphragm seal and having an axially extending rib arranged to engage said shaft ring, a cap telescopically received and locked in the open end of said casing, said cap being arranged to clamp said one end of said second diaphragm sleeve against said insertable sleeve, and a second coil spring in said casing having one end engaging said cap and the other end engaging said second retainer ring to resiliently bias the rib portion of said second seal into sealing engagement with the other radial face of said shaft ring.

2. A cartridge unit shaft seal comprising, in combination, a pair of sleeves and a shaft ring adapted to be co-rotatably mounted in axial alignment on a rotatable shaft, said shaft ring being clamped between said sleeves, a cup-shaped casing having a generally cylindrical wall portion forming a plurality of stepped counterbores progressively increasing in diameter toward the open end of the casing arranged around said shaft in the locale of said shaft ring, a first coil spring having one end engaging the closed end of the casing and arranged to encircle one of said pair of sleeves, a first retainer ring seating the other end of said first coil spring, a first flexible diaphragm sleeve having one end snugly seated on said first retainer ring and the other end engaging said wall portion of said casing and shouldered against a first annular abutment formed between said stepped counterbores, a press ring mechanically locking said other end of said first diaphragm sleeve in said casing, a first annular seal ring encircling said one end of said first diaphragm sleeve and having an axially extending rib arranged to engage one radial face of said shaft ring under the bias of said first coil spring, a sleeve insertable in said casing and having a medial annular shoulder arranged to engage a second annular abutment formed between said stepped counterbores, said sleeve and said first annular seal ring having interlocking mating means to relieve torsional strain on said first diaphragm sleeve, a second flexible diaphragm sleeve having one end engaging said wall portion of said casing and shouldered against said insertable sleeve, a second retainer ring seating the other end of said second diaphragm sleeve, a second annular seal ring encircling said other end of said diaphragm seal and having an axially extending rib arranged to engage said shaft ring, a cap telescopically received and locked in the open end of said casing, said cap being arranged to clamp said one end of said second diaphragm sleeve against said insertable sleeve, and a second coil spring in said casing having one end engaging said cap and the other end engaging said second retainer ring to resiliently bias the rib portion of said second seal into sealing engagement with the other radial face of said shaft ring, said shaft ring being provided with an obliquely disposed passageway extending from said one radial face of said shaft ring adjacent said first seal ring to said other radial face of said shaft ring radially inwardly of said second seal ring.

3. A cartridge unit shaft seal comprising, in combination, a pair of sleeves and a shaft ring adapted to be co-rotatably mounted in axial alignment on a rotatable shaft, said shaft ring being clamped between said sleeves, a cup-shaped casing having a generally cylindrical wall portion forming a plurality of stepped counterbores progressively increasing in diameter toward the open end of the casing arranged around said shaft in the locale of said shaft ring, a first coil spring having one end engaging the closed end of the casing and arranged to encircle one of said pair of sleeves, a first retainer ring seating the other end of said first coil spring, a first flexible diaphragm sleeve having one end snugly seated on said first retainer ring and the other end engaging said wall portion of said casing and shouldered against a first annular abutment formed between said stepped counterbores, a press ring mechanically locking said other end of said first diaphragm sleeve in said casing, a first annular seal ring encircling said one end of said first diaphragm sleeve and having an axially extending rib arranged to engage one radial face of said shaft ring under the bias of said first coil spring, a sleeve insertable in said casing and having a medial annular shoulder arranged to engage a second annular abutment formed between said stepped counterbores, said sleeve and said first annular seal ring having interlocking mating means to relieve torsional strain on said first diaphragm sleeve, a second flexible diaphragm sleeve having one end engaging said wall portion of said casing and shouldered against said insertable sleeve, a second retainer ring seating the other end of said second diaphragm sleeve, a second annular seal ring encircling said other end of said diaphragm seal and having an axially extending rib arranged to engage said shaft ring, a cap telescopically received and locked in the open end of said casing, said cap being arranged to clamp said one end of said second diaphragm sleeve against said insertable sleeve, and a second coil spring in said casing having one end engaging said cap and the other end engaging said second retainer ring to resiliently bias the rib portion of said second seal into sealing engagement with the other radial face of said shaft ring, said casing and said insertable sleeve being provided with a venting aperture between said first and second diaphragm seals.

4. An impeller shaft seal which comprises a shaft having a shoulder, a castellated end face spaced axially therefrom and a threaded stud projecting axially from said end face, a first sleeve on the shaft bottomed on said shoulder, a shaft ring on the shaft bottomed on the first sleeve, a second sleeve on the shaft bottomed on the shaft ring and having a perforated end face threaded on the stud and overlying the castellated end face of the shaft, said castellated end face providing keyways adapted to be registered with the perforations in the end face of said second sleeve, an impeller having a hub on said stud with keyways adapted to be registered with said perforations, pins in the hub keyways extending through said perforations into said shaft keyways, a nut threaded on the stud and bottoming the impeller hub on the end face of the second sleeve, said sleeves pinching the shaft ring therebetween, seal rings riding on opposite faces of the shaft ring, a flexible diaphragm secured to each seal ring, and a casing surrounding the shaft and sealingly carrying said diaphragms therein, whereby said shaft ring will rotate between the seal rings in sealing engagement therewith.

5. A shaft seal comprising, in combination, a shaft ring adapted to be corotatably mounted in axial alignment on a rotatable shaft, a casing having a generally cylindrical wall portion arranged around said shaft, a first coil spring having one end confined with respect to said casing and arranged to encircle said shaft, a first retainer ring seating the other end of said first coil spring, a first flexible diaphragm sleeve having one end snugly seated on said first retainer ring and the other end engaging said casing, a first annular seal ring encircling said one end of said first diaphragm sleeve and having an axially extending rib arranged to engage one radial face of said shaft ring under the bias of said first coil spring, a spacer sleeve in said casing, said spacer sleeve and said first annular seal ring having interlocking mating means to relieve torsional strain on said first diaphragm sleeve, a second flexible diaphragm sleeve having one end engaging said casing and shouldered against said sleeve, a second retainer ring seating the other end of said second diaphragm sleeve, a second annular seal ring encircling said other end of said diaphragm seal and having an axially extending rib arranged to engage said shaft ring, and a second coil spring in said casing having one end confined with respect to said casing and the other end engaging said second retainer ring to resiliently bias the rib portion of said second seal ring into sealing engagement with the other radial face of said shaft ring, said shaft ring being provided with an obliquely disposed passageway extending from said radial face of said shaft ring adjacent said first seal ring to said other radial face of said shaft ring radially inwardly of said second seal ring.

6. A shaft seal comprising, in combination, a shaft ring adapted to be corotatably mounted in axial alignment on a rotatable shaft, a casing having a generally cylindrical wall portion arranged around said shaft, a first coil spring having one end confined with respect to said casing and arranged to encircle said shaft, a first retainer ring seating the other end of said first coil spring, a first flexible diaphragm sleeve having one end snugly seated on said first retainer ring and the other end engaging said casing, a first annular seal ring encircling said one end of said first diaphragm sleeve and having an axially extending rib arranged to engage one radial face of said shaft ring under the bias of said first coil spring, a spacer sleeve in said casing, said spacer sleeve and said first annular seal ring having interlocking mating means to relieve torsional strain on said first diaphragm sleeve, a second flexible diaphragm sleeve having one end engaging said casing and shouldered against said sleeve, a second retainer ring seating the other end of said second diaphragm sleeve, a second annular seal ring encircling said other end of said diaphragm sleeve and having an axially extending rib arranged to engage said shaft ring, and a second coil spring in said casing having one end confined with respect to said casing and the other end engaging said second retainer ring to resiliently bias the rib portion of said second seal ring into sealing engagement with the other radial face of said shaft ring, said shaft ring being provided with an obliquely disposed passageway extending from said radial face of said shaft ring adjacent said first seal ring to said other radial face of said shaft ring radially inwardly of said second seal ring, said casing and said spacer sleeve being provided with a venting aperture between the seals effected by said first and second diaphragm sleeves.

ROBERT CLIBORN.

References Cited in the file of this patent

UNITED STATES PATENTS

| Number | Name | Date |
|---|---|---|
| 1,876,515 | Emmet | Sept. 6, 1932 |
| 2,244,450 | Erni | June 3, 1941 |
| 2,420,557 | Mueller | May 13, 1947 |
| 2,444,713 | Solari | July 6, 1948 |
| 2,470,419 | Voytech | May 17, 1949 |
| 2,479,711 | Arutunoff | Aug. 23, 1949 |
| 2,538,987 | Synek | Jan. 23, 1951 |
| 2,555,492 | Kidney | June 5, 1951 |

FOREIGN PATENTS

| Number | Country | Date |
|---|---|---|
| 511,217 | Germany | Oct. 29, 1930 |